United States Patent
Heyder et al.

(12) 
(10) Patent No.: US 6,270,320 B1
(45) Date of Patent: Aug. 7, 2001

(54) ELECTRIC MOTOR WITH A FAN WHEEL, FOR FORMING AN AXIAL OR RADIAL FAN

(75) Inventors: Martin Heyder, Buehl-Eisental; Wolfgang Schwenk, Oberkirch-Tiergarten, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/424,341

(22) PCT Filed: Jan. 14, 1999

(86) PCT No.: PCT/DE99/00046

§ 371 Date: Nov. 22, 1999

§ 102(e) Date: Nov. 22, 1999

(87) PCT Pub. No.: WO99/49554

PCT Pub. Date: Sep. 30, 1999

(30) Foreign Application Priority Data

Mar. 24, 1998 (DE) .............................. 198 12 729

(51) Int. Cl.⁷ .................................................. F04B 17/00
(52) U.S. Cl. ........................................ 417/44.1; 417/423.1
(58) Field of Search ................................ 417/44.1, 423.1; 310/67 R, 71; 361/697

(56) References Cited

U.S. PATENT DOCUMENTS

| | | | |
|---|---|---|---|
| 4,473,113 | * | 9/1984 | Whitfield et al. ...................... 165/185 |
| 5,189,327 | * | 2/1993 | Ootsuka et al. ......................... 310/71 |
| 5,264,748 | * | 11/1993 | Ootsuka et al. ......................... 310/90 |
| 5,358,795 | * | 10/1994 | Nakamura et al. ................... 428/614 |
| 5,360,322 | * | 11/1994 | Henein et al. ......................... 417/313 |
| 5,411,372 | * | 5/1995 | Clark ..................................... 416/110 |
| 5,925,948 | * | 7/1999 | Matsumoto ......................... 310/67 R |
| 6,069,794 | * | 5/2000 | Chuang ................................. 361/697 |

* cited by examiner

Primary Examiner—Timothy S. Thorpe
Assistant Examiner—Ehud Gartenberg
(74) Attorney, Agent, or Firm—Ronald E. Greigg; Edwin E. Greigg

(57) ABSTRACT

A motor with a fan wheel for forming an axial or radial fan, having a drive unit and a control unit that has a control housing. The drive unit has a stator, a rotor, and at least one electric coil, and the control unit has an electronic circuit for open- or closed-loop control of the supply of current to the coil. The drive unit and the control unit are formed by modules, and contact elements associated with one another are provided for mutual electrical connection.

22 Claims, 3 Drawing Sheets

ELECTRIC MOTOR WITH A FAN WHEEL, FOR FORMING AN AXIAL OR RADIAL FAN

The invention relates to an electric motor, with a fan wheel, for forming an axial or radial fan. The invention also relates to an axial or radial fan with an electric motor according to the invention.

PRIOR ART

In a known electric motor, the drive unit and the control unit are thermally decoupled by being physically separate in structure; for the sake of better heat dissipation, the control unit is disposed in the fan casing and is connected to the drive unit via a cable harness. This arrangement does not have optimal fan efficiency, and because of the additional provision of the cable harness that connects the control unit to the drive unit, it cannot be manufactured optimally.

In a known hot blower with integrated electronics, the control unit is integrated in the housing of the drive unit and is protected against environmental factors, using a common cover cap, by means of a potting compound. In this hot blower, there is no need for formal decoupling between the control unit and the drive unit, and it is therefore not provided.

Another electric motor for an axial fan is known from European Patent Disclosure EP 0 715 396 A1. This known electric motor has a cylindrical motor housing, in front of a front face end a fan wheel is connected to the rotating shaft, and a rear face end is formed by a bearing plate on which a governor housing is mounted, on a side behind the motor and remote from the fan wheel. Between the motor housing and the governor housing, there is an air gap, and the electrical connection between the motor and the governor is made by means of a cable harness that spans this air gap. On the one hand, the thermal decoupling between the motor housing and the governor housing is not optimal, despite the air gap, because the governor housing is secured directly to the motor housing; on the other hand, the provision of a cable harness for electrically connecting the governor to the motor requires complicated and expensive electrical connection work in the final manufacture of a motor or the axial fan.

Such complicated assembly work increases the production cost and is therefore undesired. Furthermore, thermal influences on the part of the control unit on the drive unit should be avoided as much as possible.

ADVANTAGES OF THE INVENTION

The electric motor has an advantage over the prior art that because of the provision of the contact elements associated with one another, fast mounting of the control unit on the drive unit is possible, so that the control unit and drive unit can be prefabricated in modular form and then mounted together. When the contact elements are extended out of the respective housing, a direct housing contact between the drive unit and the control unit is not necessary, and thus improved thermal decoupling is attainable.

It is especially advantageous if the drive unit and the control unit are embodied cylindrically. In this way, both the drive unit and the control unit can be mounted in the lee of the hub of the fan wheel of an axial fan relative to the flow, so that the flow remains maximally unimpeded.

It is also possible, however, for the drive unit to be embodied cylindrically, while the control unit has a partly cylindrical, in particular semicylindrical, form. As a result, once again the flow through the axial fan is maximally unaffected. The advantage of this version, however, is that the control unit can be inserted laterally for assembly, or in other words crosswise to the axis of the electric motor, which for certain constructions and in particular certain constructions of contact elements makes for easier installation.

It is especially advantageous if the contact elements of the drive unit are provided in a region of the center axis and extend substantially axially out of the contour of the drive unit, and that the contact elements of the control unit are provided in a region of the center axis in a recess of the housing of the control unit. The phrase "in the region of the center axis" means for instance disposed around the center axis. In this embodiment, the courses for the electrical lines between the winding of the drive unit and the open- or closed-loop control electronics in the control unit are minimized in length, thus minimizing both line losses and the outputting of interference signals to the outside.

It is also advantageous if the control housing is provided with a further recess in its outside circumference, and if in the further recess, connection elements for the supply of current to the control unit are provided. By the provision of connection elements, the possibility is intrinsically created of installing the control unit in modular form and replacing it as needed, without requiring complicated electrical connection work.

Disposing the connection elements in a recess in the outer circumference assures that the electrical connections for the control unit will not protrude into the flow conduit of an axial fan, and thus will not impede the air flow.

An especially advantageous possibility for installing the control unit exists if the contact elements of the drive unit are formed by contact pins, while the contact elements of the control unit are formed by contact bushes or contact forks. In this way, the control unit can be attached to the drive unit simply and without major electrical installation work. If contact forks are used, the connection between the contact pins and the contact forks can be secured in some other way as well, such as by soldering or welding or with screws or rivets.

Alternatively, the contact elements of the drive unit can be formed by contact bushes or contact forks, while the contact elements of the control unit are formed by contact pins. Once again, this makes it possible simply to put the control unit and the drive unit together.

In an especially advantageous feature, the control housing is provided with fastening tabs protruding from the outline of the housing. These fastening tabs allow the control unit to be mounted in spaced-apart fashion on the corresponding mounting face, such as the hub of a stator, and as a result there is only slight surface contact between the control unit and the associated mounting face, so that direct heat dissipation from the control unit to the mounting face is minimized.

If electronic power components are connected to the tub-like control housing in electrically insulating and highly heat-conducting fashion, and if the control housing is formed of a material that is a good heat conductor, than good heat dissipation is assured.

If the heat-dissipating face of the tub-like control housing is located on the side remote from the drive unit, then the heat occurring in the control housing is carried away by the air flow as it sweeps passed and is not conducted to the drive unit.

If the control housing is provided with cooling fins, then the heat dissipation becomes perceptibly more effective.

The invention also relates to an axial or radial fan with an electric motor, in which the rotating part of the drive unit is connected to a fan wheel, and the non-rotating part of the drive unit is connected to a stator flange, and the stator flange is located between the drive unit and the control unit. An axial or radial fan of this kind is distinguished by a modular design, in which the drive unit and the control unit can be produced, mounted and also replaced separately. The disposition of the stator flange between the drive unit and the control unit assures an extremely effective thermal decoupling of the control unit from the drive unit, so that the direct heat conduction from the control unit to the drive unit is greatly minimized. Since the control unit is located behind the drive unit and the stator flange, or in other words on the downstream side of the air flow passing through the axial or radial fan, the heat that occurs in the control unit is dissipated directly to the air flow; to that end, cooling fins can also be provided in the control housing, in a known manner.

It is additionally advantageous if an air chamber is additionally formed between the drive unit and the control unit. By the provision of this air chamber, the heat conduction from the control unit to the drive unit is further reduced, and a possible flow through the air chamber assures further heat dissipation from the surface of the control unit; the end face of the control unit adjoining the air chamber may also be provided with preferably radially extending cooling fins.

BRIEF DESCRIPTION OF THE DRAWINGS

Exemplary embodiments of the invention are shown in the drawings and described in further detail below. Shown are.

In the various drawing figures, components corresponding to one another are identified by the same reference numerals.

DESCRIPTION OF THE EXEMPLARY EMBODIMENTS

Figure 1:
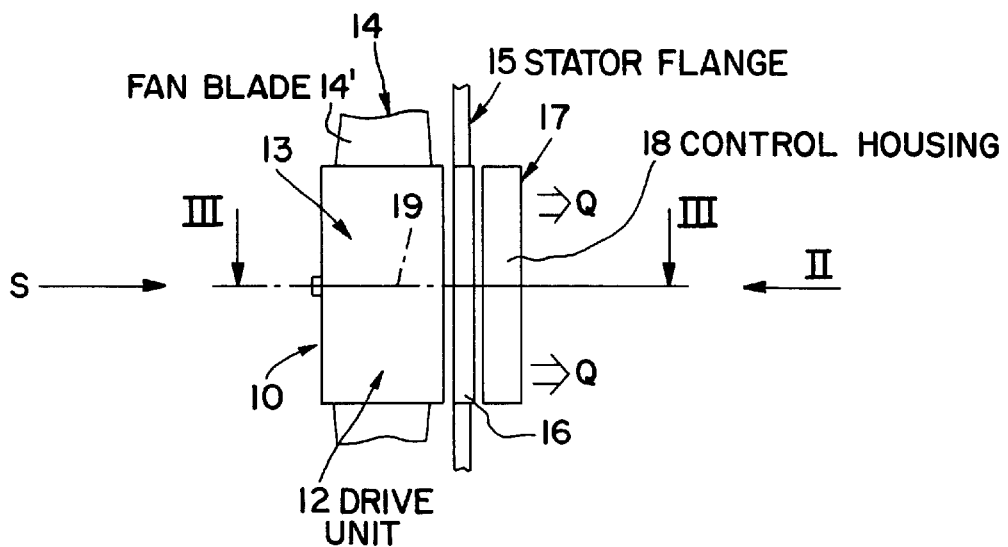
FIG. 1, partly in section, the side view of an axial fan with an electric motor according to the invention.

As FIG. 1 shows, an electric motor 10 is integrated into the hub of an axial fan 11 (FIG. 2); a drive unit 12 has a revolving rotor 13 with a rotor housing 13', on which radially extending fan blades 14' are mounted and thus form a fan wheel 14. In a feature of the invention not shown in detail, the fan blades are embodied such that a radial deflection of the air occurs, forming a radial fan of known construction. This drive unit is disposed in the flow direction S in front of a stator flange 15, whose hub 16 is located adjacent the rear end wall of the drive unit 12. Behind the hub 16 of the stator flange 15 in terms of the flow direction, there is a D control unit 17, which contains an electronic open- or closed-loop controller for the drive unit 12. The rotor housing 13', the hub 16, and the housing 18 of the control unit 17 are cylindrical in form, with the same diameter, and are disposed coaxially along the axis 19 of the axial fan.

Figure 2:
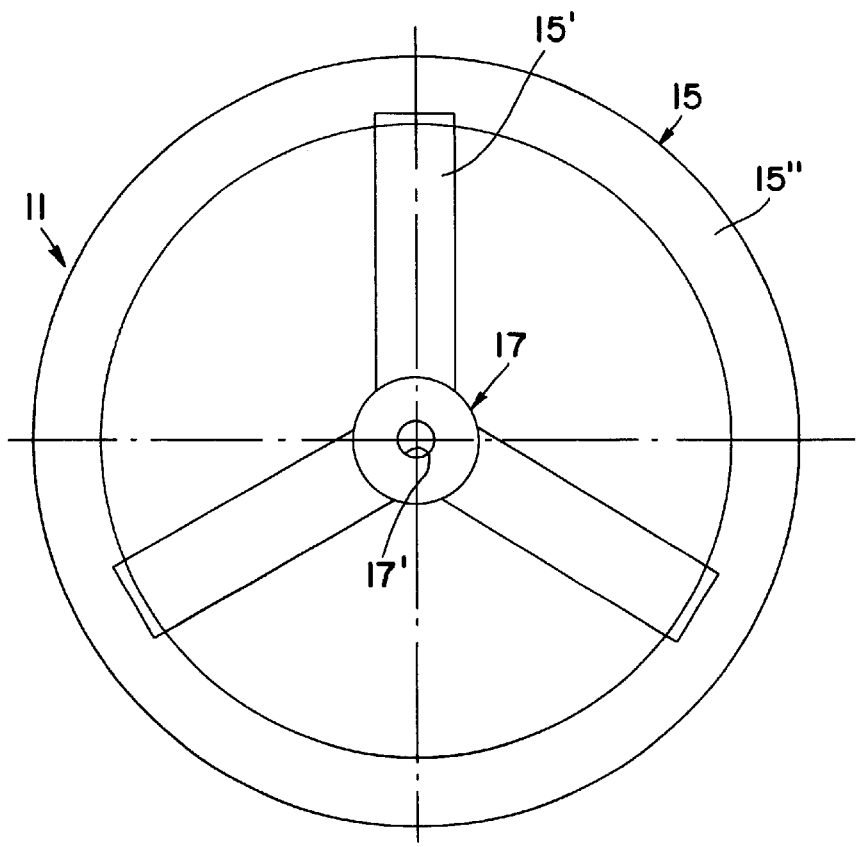
FIG. 2, the view of an axial fan from behind, in the direction indicated by arrow II in FIG. 1.

FIG. 2 shows a view of the stator flange 15 of FIG. 1 from behind, without a control unit; the stator flange 15 can be seen, along with its blades 15' and its stator ring 15", which serves to secure the motor on a motor receptacle, not shown. The control unit 17 is provided with an opening 17', which is for instance oriented centrally, and in which as will be explained in detail later contact elements are provided.

Figure 3:
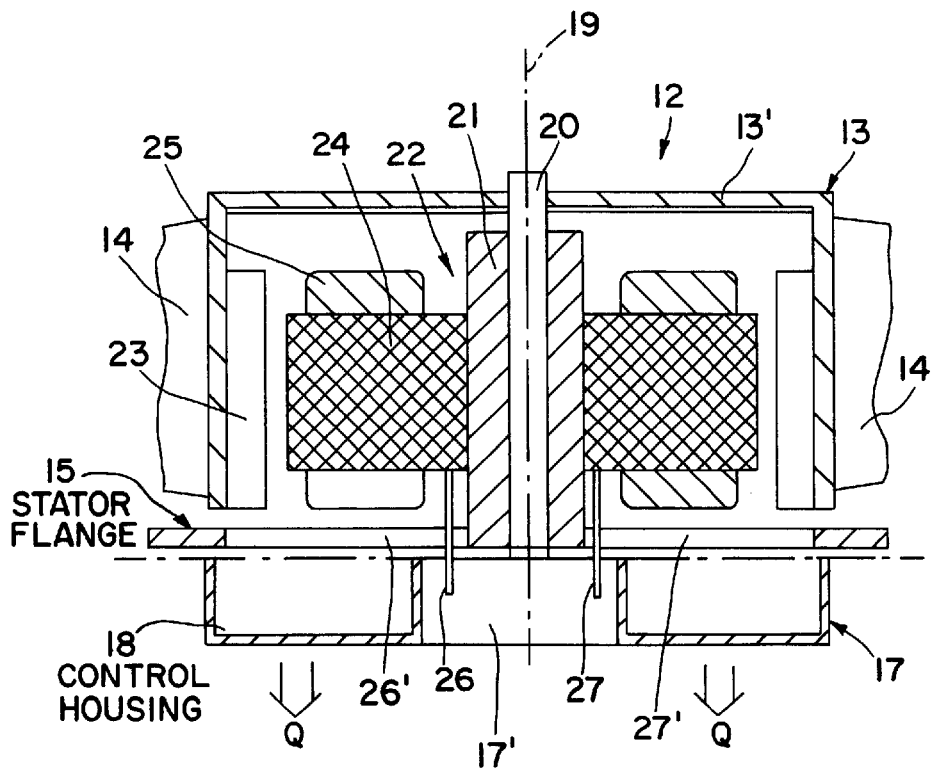
FIG. 3, a longitudinal section through an electric motor taken along the line III—III of FIG. 1, FIG. 4, an electrical contact connection between the drive unit and the control unit.

In FIG. 3, a section through an axial plane of the axial fan of FIG. 1 is shown, taken along the line III—III. The drive unit 12 is embodied as an external rotor, and the rotor housing 13' provided with the fan blades 14' is connected in a manner fixed against relative rotation to a motor shaft 20, which is supported rotatably inside a bearing 21 of the stator 22. The geometric axis of the motor shaft 20 is equivalent to the axis 19 of the axial fan 11.

Magnets 23 oriented radially inward are disposed in a known manner in the region of the inner circumference of the rotor housing 13'. The stator assembly 22 is provided with a lamination packet 24 and with windings of an electric coil 25. The windings of the electric coil 25 end in contact pins 26, 27 which in the radially inner region of the drive unit 12, adjacent to the bearing 21, protrude axially to the rear out of the drive unit 12 and emerge through corresponding openings 26', 27' in the stator flange 15; they protrude past the rear boundary of the stator flange 15.

A control unit 17 schematically shown in FIG. 3 is disposed on the back side of the stator flange 15; it has a control housing 18, which takes the form of a circular-annular tub, with the circular-annular tub open toward the stator flange 15. The contact pins 26, 27 of the drive unit 12 enter into the central opening 17' of the control housing 18. The wall of the control housing 18 is formed of a material that is an especially good heat conductor.

Figure 4:
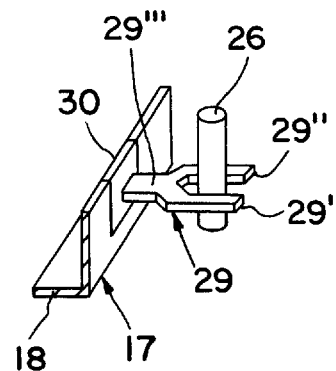

In FIG. 4, one example for electrical contacting between the contact pins 26, 27, of which as an example only the contact pin 26 is shown here, with an associated contact fork 29 of the control unit 17. The contact fork 29 receives the contact pin 26 in the interstice between its contact fork tines 29, 29" where it is either mechanically held and electrically contacted by being clamped between the tines 29', 29", or is connected electrically and mechanically to the contact fork 29 by a welded or soldered connection. The contact fork 29 passes with its stem 29''' through an insulating element 30 inserted into the wall of the control housing 18. On the inside of the control housing 18, the stem 29''' of the contact fork 29 is connected with corresponding electrical or electronic elements, as schematically shown in FIG. 5.

Figure 5:
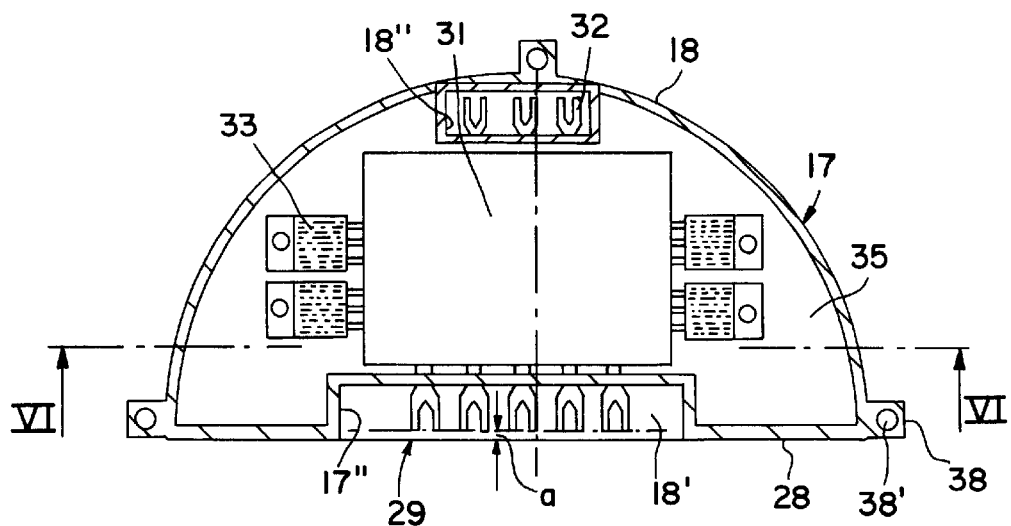
FIG. 5, a plan view on a control unit that is not closed.

FIG. 5 shows a plan view on an unclosed control unit 17, in which a schematically shown electric circuit board 31 is connected with a plurality of inner contact forks 29, which are embodied for contacting with the contact pins 26, 27 of the drive unit 12. The contact forks 29 are placed in a radially inner recess 17", which in the example of FIG. 5 is rectangular in shape, and which in the example of FIG. 5 is provided instead of the above-described central opening 17' of the control unit 17. The radially inner recess 17" is covered in the rear region by the rear end wall 18' of the control housing 18, so that in the built-in state of the control housing 18, the contact forks 29 are protected against environmental factors.

The control housing 18 is semicircular in outline; the entire open- or closed-loop controller required to operate the drive unit 12 can be contained in a semicircular control housing 18, as shown in FIG. 5, or in two such semicircular control housings that together form one cylindrical control unit 17, as shown in FIGS. 1 and 2.

The semicircular shape of the control housing 18 makes it possible to insert the semicircular control housing 18 from the side, for instance, or in other words transversely to the axis 19 of the axial fan; the contact forks 29 are also thrust from the side onto the contact pins 26, 27 and preferably in clamping fashion force them to make mechanical and electrical contact.

The free ends of the tines 29', 29" of the contact forks 29 are spaced apart from the plane that the outer surface of the diametrically opposed boundary wall 28 defines, as represented by the spacing a in FIG. 5. As a result, the various contact forks 29 of the individual semicircular control housings, when two semicircular control housings 18 are inserted to form a common control unit 17, are prevented from touching one another.

On the radially outer side of the control housing 18 opposite in terms of the radially inner recess 17", a radially outer recess 18' is provided, which receives connection elements 32 that are embodied in fork-like fashion in the same way as the contact forks 29 and are also passed in the same way through the wall of the control housing 18. The connection elements 32 provide connection to an electrical power for the electric motor 10. While the contact forks 29 are oriented such that their tines 29', 29" are each located in the same plane, which extends at right angles to the axis 19 of the axial fan 11, the orientation of the fork-like connection elements is not prescribed in compulsory fashion; however, an equivalent orientation for the connection elements 32 as for the contact forks 29 is preferred.

Figure 6:
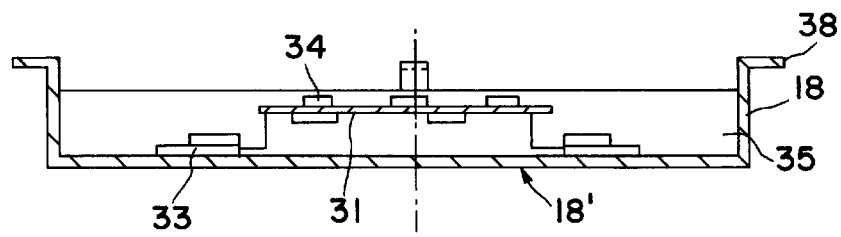
FIG. 6, a sectional view of the control unit of FIG. 5 taken along the line VI—VI of FIG. 5.

On its outer circumference, the control housing 18 is provided with radially protruding fastening tabs 38, which have a fastening bore 38', through which screws or rivets can be passed in a known manner for securing the control unit 17. The fastening tabs 38 may also protrude axially past the front boundary of the control housing 18, as is shown in FIG. 6; as a result, after the fastening, an air interstice is created between the mounting face for the control unit 17 and the front side (the top side in FIG. 6) of the control unit 17.

It can also be seen in FIG. 5 that electronic power components, such as field effect transistors (FETs), protrude laterally from the circuit board 31 and are secured directly to the back wall 18', which is an especially good heat conductor, of the control housing 18; for the fastening, a means that is a good heat conductor can additionally be placed between the respective FET and the back wall 18'. This arrangement can be seen particularly well in the sectional view of FIG. 6. In FIG. 6, other electronic components are also shown, preferably SMD (surface mounted device) components 34. The interior 35 of the control unit 17, which is defined by the control housing 18, is potted with a casting resin in a known manner or closed with a cap, after the circuit board 31 and the other electrical and electronic components 33, 34 have been installed, in order to seal off the electronic open- or closed-loop control circuit hermetically from its surroundings. Only the contact forks 29 and the connection elements 32 thereafter still form connections with the electronic circuit contained in the control unit 17.

Figure 7:
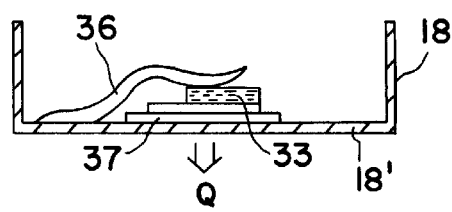
FIG. 7, a fundamental sketch for securing a power component in the control unit.

In FIG. 7, a detail is shown, as an example for a possible way of securing a FET 33 in the control housing 18; the power component, that is, the FET 33, is pressed by a retaining spring 36 against the back wall 18 of the control housing 18 and is retained in clamping fashion in this way. Between the FET 33 and the back wall 18, an electrically insulating but highly heat-conducting intermediate layer, preferably an insulating film 37 so that while heat conduction between the FET 33 and the back wall 18' is enabled, electrical conduction between these elements is prevented. The arrow Q shown in FIGS. 1, 3 and 7 symbolically indicates the direction of heat dissipation from the control housing 18 of the control unit 17.

The foregoing relates to a preferred exemplary embodiments of the invention, it being understood that other variants and embodiments thereof are possible within the spirit and scope of the invention, the latter being defined by the appended claims.

What is claimed is:

1. An electric motor (10), comprising a fan wheel (14) for forming an axial or radial fan (11), a drive unit (12) and a control unit (17) that has a control housing (18) which surrounds the control unit (17), wherein the drive unit (12) has a stator (22), a rotor (13), and electric coils (25), and the control unit (17) has an electronic circuit for open- or closed-loop control of the supply of current to the coils (25), the drive unit (12) and the control unit (17) surrounded by the control housing (18) are formed by separate modules, and that contact elements (26, 27, 29) associated with one another are provided for mutual electrical connection, and electronic power components (33) are connected to the control housing (18) in electrically insulating and highly heat-conducting fashion, and that the control housing (18) is formed at least in part of a material that is a good heat conductor, and the rotor (13) of the drive unit (12) is connected to the fan wheel (14), and the stator (22) of the drive unit (12) is connected to a stator flange (15), and the stator flange (15) is located between the drive unit (12) and the control unit (17).

2. The electric motor according to claim 1, in which the drive unit (12) and the control unit (17) are embodied cylindrically.

3. The electric motor according to claim 1, in which the drive unit (12) is embodied cylindrically, and that the control unit (17) has a partly cylindrical, form.

4. The electric motor according to claim 1, in which the contact elements (26, 27) of the drive unit (12) are provided in a region of a center axis (19) and extend substantially axially out of a contour of the drive unit (12), and that the contact elements (29) of the control unit (17) are provided in the region of the center axis (19) in a recess (17', 17") of the housing (18) of the control unit (17).

5. The electric motor according to claim 2, in which the contact elements (26, 27) of the drive unit (12) are provided in a region of a center axis (19) and extend substantially axially out of a contour of the drive unit (12), and that the contact elements (29) of the control unit (17) are provided in the region of the center axis (19) in a recess (17', 17") of the housing (18) of the control unit (17).

6. The electric motor according to claim 3, in which the contact elements (26, 27) of the drive unit (12) are provided in a region of a center axis (19) and extend substantially axially out of a contour of the drive unit (12), and that the contact elements (29) of the control unit (17) are provided in the region of the center axis (19) in a recess (17', 17") of the housing (18) of the control unit (17).

7. The electric motor according to claim 1, in which the control housing (18) is provided with a further recess (18") in an outside circumference, and that in the further recess (18"), connection elements (32) for the supply of current to the control unit (17) are provided.

8. The electric motor according to claim 2, in which the control housing (18) is provided with a further recess (18") in an outside circumference, and that in the further recess (18"), connection elements (32) for the supply of current to the control unit (17) are provided.

9. The electric motor according to claim 3, in which the control housing (18) is provided with a further recess (18") in an outside circumference, and that in the further recess (18"), connection elements (32) for the supply of current to the control unit (17) are provided.

10. The electric motor according to claim 1, in which the contact elements (26, 27) of the drive unit (12) are formed by contact pins, while the contact elements (29) of the control unit (17) are formed by contact bushes or contact forks.

11. The electric motor according to claim 2, in which the contact elements (26, 27) of the drive unit (12) are formed by contact pins, while the contact elements (29) of the control unit (17) are formed by contact bushes or contact forks.

12. The electric motor according to claim 3, in which the contact elements (26, 27) of the drive unit (12) are formed by contact pins, while the contact elements (29) of the control unit (17) are formed by contact bushes or contact forks.

13. The electric motor according to claim 1, in which the contact elements (26, 27) of the drive unit (12) are formed by contact bushes or contact forks, while the contact elements (29) of the control unit (17) are formed by contact pins.

14. The electric motor according to claim 2, in which the contact elements (26, 27) of the drive unit (12) are formed by contact bushes or contact forks, while the contact elements (29) of the control unit (17) are formed by contact pins.

15. The electric motor according to claim 3, in which the contact elements (26, 27) of the drive unit (12) are formed by contact bushes or contact forks, while the contact elements (29) of the control unit (17) are formed by contact pins.

16. The electric motor according to claim 1, in that the control housing (18) is provided with fastening tabs (38) that protrude from the housing.

17. The electric motor according to claim 2, in that the control housing (18) is provided with fastening tabs (38) that protrude from the housing.

18. The electric motor according to claim 3, in that the control housing (18) is provided with fastening tabs (38) that protrude from the housing.

19. The electric motor according to claim 1, in which the heat-dissipating face (18') of the tub-like control housing (18) is located on a side remote from the drive unit (12).

20. The electric motor according to claim 1, in which the control housing (18) is provided with cooling fins.

21. The electric motor according to claim 19, in which the control housing (18) is provided with cooling fins.

22. The axial or radial fan (11) according to claim 1, in which an air chamber is additionally formed between the drive unit (12) and the control unit (17).

* * * * *